(12) United States Patent
Hosoya et al.

(10) Patent No.: US 7,702,823 B2
(45) Date of Patent: Apr. 20, 2010

(54) DISK SUBSYSTEM MONITORING FAULT

(75) Inventors: Mutsumi Hosoya, Fujimi (JP); Akira Fujibayashi, Sagami (JP); Shuji Nakamura, Yokohama (JP); Yasuo Inoue, Odawara (JP)

(73) Assignee: Hitachi, Ltd., Tokyo (JP)

( * ) Notice: Subject to any disclaimer, the term of this patent is extended or adjusted under 35 U.S.C. 154(b) by 718 days.

(21) Appl. No.: 10/980,242

(22) Filed: Nov. 4, 2004

(65) Prior Publication Data
US 2006/0048018 A1 Mar. 2, 2006

(30) Foreign Application Priority Data
Sep. 2, 2004 (JP) ............... 2004-255626

(51) Int. Cl.
*G06F 3/00* (2006.01)
(52) U.S. Cl. .............. 710/15; 710/16; 710/17; 710/18; 710/19
(58) Field of Classification Search ........... 710/15–19
See application file for complete search history.

(56) References Cited

U.S. PATENT DOCUMENTS

| 6,356,984 | B1 * | 3/2002 | Day et al. .......... | 711/147 |
| 6,542,954 | B1 | 4/2003 | Aruga | |
| 7,036,033 | B1 * | 4/2006 | Price ............... | 713/340 |
| 7,280,485 | B2 * | 10/2007 | Suenaga ............ | 370/241 |

2002/0194524 A1 12/2002 Wiley et al.

FOREIGN PATENT DOCUMENTS

| EP | 0969629 A2 | 5/2000 |
| EP | 09669629 | 5/2000 |
| JP | 10-116233 | 5/1998 |
| JP | 2000-222339 | 8/2000 |
| JP | 2001-249856 | 9/2001 |
| JP | 2002-032878 | 1/2002 |
| JP | 2002-063063 | 2/2002 |
| WO | WO 03/021858 | 3/2003 |

OTHER PUBLICATIONS

Office Action in Japanese Patent Application No. 2004-255626, dated Jan. 6, 2010.

* cited by examiner

*Primary Examiner*—Chun-Kuan Lee
(74) *Attorney, Agent, or Firm*—Antonelli, Terry, Stout & Kraus, LLP.

(57) ABSTRACT

This invention enables a disk subsystem that employs the FC-AL connection to grasp the operation status of each disk drive, quickly locate a disk drive that has failed, and promptly carry out blocking processing. In a disk subsystem including plural drive enclosures which store disk drives, and a disk controller which controls transfer of data stored in the disk drives between the drive enclosures and a host computer. The drive enclosures each comprise a backend switch which is connected to the disk drives and to the disk controller, the backend switch comprises a status monitoring port through which operation status of switch ports of the backend switch is outputted, and the disk controller monitors a fault of the switch ports through the status monitoring port.

15 Claims, 13 Drawing Sheets

DISK SUBSYSTEM MONITORING FAULT

CLAIM OF PRIORITY

The present application claims priority from Japanese application P2004-255626 filed on Sep. 2, 2004, the content of which is hereby incorporated by reference into this application.

BACKGROUND

This invention relates to a disk subsystem composed of a disk controller and plural drive enclosures. More specifically, this invention relates to a technique which enables a disk controller to obtain drive enclosure fault information.

A disk subsystem which uses a magnetic disk drive as a storage medium is composed of a disk controller and plural drive enclosures. A Fibre Channel-arbitrated loop (FC-AL) is commonly employed to connect the disk controller and the drive enclosures with each other, thus enabling the disk subsystem to store these many drive enclosures.

FIG. 13 is a block diagram of a conventional disk subsystem.

The conventional disk subsystem is composed of a disk controller 10 and plural drive enclosures 500.

The disk controller 10 has a channel adapter 100, a disk adapter 200, a memory adapter 300, and a switch adapter 400.

The channel adapter 100 has a connection interface to connect with a host computer. The disk adapter 200 has a connection interface to connect with the drive enclosures 500. The memory adapter 300 temporarily stores data that is transferred between the host computer and the drive enclosures.

The switch adapter 400 connects DMA controllers 120, 220, and 320, which are provided in the channel adapter 100, the disk adapter 200, and the memory adapter 300, respectively, with one another to build an internal network.

The drive enclosures 500 each have plural disk drives 540. The drive enclosures 500 and the disk controller 10 are connected to each other via protocol engines 230, which are placed in the disk adapter 200, and via port bypass circuits 590, which are each in their respective drive enclosures 500.

The drive enclosures 500 are connected with one another via the port bypass circuits 590. The FC-AL connection is characterized by the port bypass circuits 590 connecting the many disk drives 540. Input ports and output ports of the disk drives 540, which are connected with one another by the FC-AL connection, are connected by a cascade connection to form one loop.

In the FC-AL connection, competition for a loop access right is arbitrated among the disk drives 540 that are connected in a loop and some of the disk drives 540 that have acquired the access right transfer data. Accordingly, an increase in number of the disk drives 540 connected raises problems concerning the data transfer bandwidth of the loop and thereby degrades the performance.

A known solution to this problem is a technique of reducing interference between the disk drives 540 upon data transfer by replacing the port bypass circuits 590 with switches (see JP 2000-222339 A, for example).

SUMMARY

The conventional FC-AL connection is capable of connecting a number of drives to a disk controller efficiently. However, with many (up through 100) disk drives, port bypass circuits or switches, and others connected to the same single port of a disk controller, it is difficult to locate where a fault has occurred.

In addition, since data is transferred via a loop which is a common path, the possibility is strong that malfunction of a disk drive in the loop that has failed is passed on to another disk drive. The propagation of fault can multiply faults and induce a more serious trouble before the disk drive that has failed is located and blocked.

This invention has been made to solve these problems, and it is therefore an object of this invention to facilitate locating and blocking of a fault point for containment of fault propagation without losing the efficiency in connecting disk drives.

According to an embodiment of this invention, there is provided a disk subsystem including plural drive enclosures which store disk drives, and a disk controller which controls transfer of data stored in the disk drives between the drive enclosures and a host computer. The drive enclosures each include a backend switch which is connected to the disk drives and to the disk controller, the backend switch includes a status monitoring port through which operation status of switch ports of the backend switch is outputted, and the disk controller monitors the switch ports for faults through the status monitoring port.

According to the embodiment of this invention, a disk subsystem that employs the FC-AL connection can grasp the operation status of each disk drive, quickly locate a disk drive that has failed, and promptly carry out blocking processing.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

Embodiments of this invention will be described below with reference to the accompanying drawings.

First Embodiment

Figure 1:
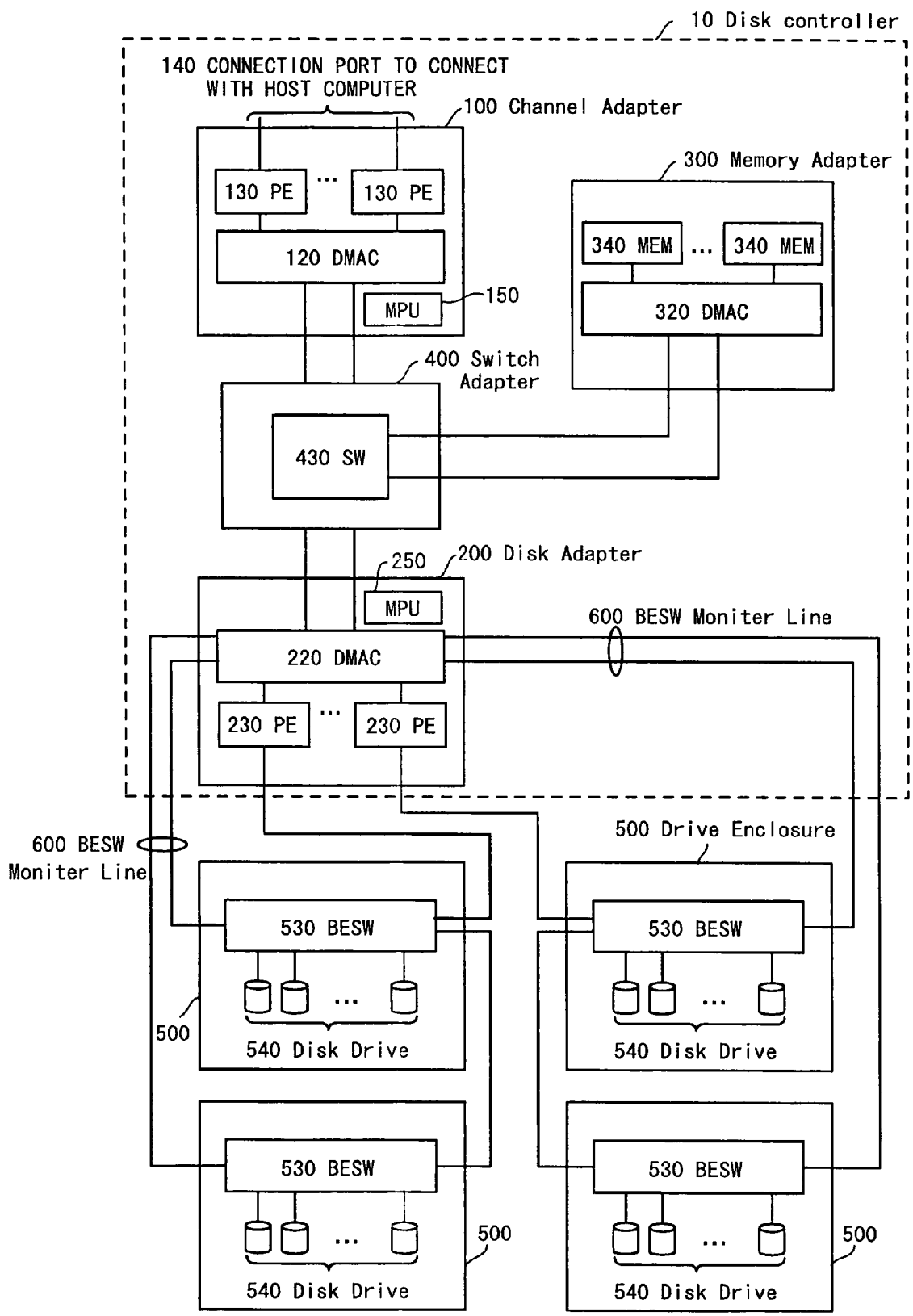
FIG. 1 is a block diagram of a disk subsystem according to a first embodiment of this invention.

FIG. 1 is a block diagram of a disk subsystem according to a first embodiment of this invention.

The disk subsystem of the first embodiment is composed of a disk controller 10 and plural drive enclosures 500. There are four drive enclosures 500 in FIG. 1 but the number of the drive enclosures 500 may be more or less than four.

The disk controller 10 has a channel adapter 100, a disk adapter 200, a memory adapter 300, and a switch adapter 400. The disk controller 10 controls data input/output between a host computer and the drive enclosures 500.

The channel adapter 100 has a DMA controller 120, protocol engines 130, a connection port 140, and a processor 150. The channel adapter 100 communicates with the host computer.

The DMA controller 120 is connected to the switch adapter 400 to communicate with the disk adapter 200 and the memory adapter 300.

The connection port 140 is connected to the host computer. The protocol engines 130 convert, for example, an internal protocol used by the disk controller 10 into a Fibre Channel protocol used by the host computer.

The processor 150 controls the overall operation of the channel adapter 100.

The disk adapter 200 has a DMA controller 220, protocol engines 230 and a processor 250, and communicates with the drive enclosures 500.

The DMA controller 220 is connected to the switch adapter 400 to communicate with the channel adapter 100 and the memory adapter 300.

The protocol engines 230 convert, for example, an internal protocol used by the disk controller 10 into a Fibre Channel protocol used by the drive enclosures 500.

The processor 250 controls the overall operation of the disk adapter 200.

The memory adapter 300 has a DMA controller 320 and memory modules 340.

The DMA controller 320 is connected to the switch adapter 400 to communicate with the channel adapter 100 and the disk adapter 200.

The memory modules 340 temporarily store data transferred between the host computer and the drive enclosures 500.

The switch adapter 400 has a switch 430. The switch 430 is connected to the DMA controller 120 in the channel adapter 100, the DMA controller 220 in the disk adapter 200, and the DMA controller 320 in the memory adapter 300 to build an internal network.

The drive enclosures 500 each have a backend switch 530 and plural disk drives 540.

The backend switch 530 is connected to the disk drives 540 to transfer data from the host computer to the disk drives 540 (details will be described later with reference to FIG. 2). The backend switch 530 and the disk drives 540, which are connected to each other by a single line in FIG. 1, may be connected with each other via plural paths for redundancy. Connecting the switch to the drives in a manner that ensures redundancy makes it possible to, when a fault happens along one of the paths, locate a fault point and continue processing by using the rest of the paths.

The disk drives 540 store data of the host computer.

A main data path is built by connecting the backend switch 530 in each of the drive enclosures 500 to the protocol engines 230 in the disk adapter 200 through the FC-AL connection.

Data to be read out of the disk drives 540 or to be written in the disk drives 540 by the host computer is communicated over the main data path.

According to the FC-AL connection in the first embodiment, one loop is formed by a cascade connection of input ports and output ports between the backend switch 530 of one of the drive enclosures 500 and the backend switch 530 of another of the drive enclosures 500. The main data path has two transmission lines, one is for sending and the other is for receiving data by the disk adapter 200, which are represented by a single line in FIG. 1. The transmission line for sending and the transmission line for receiving establish a loop.

A control path is built by using backend switch status monitor lines 600 to directly connect the backend switch 530 in every one of the drive enclosures 500 with the DMA controller 220 in the disk adapter 200. Fault information or other backend switch status information, information for control of the backend switches, and other similar information are communicated over the control path.

Figure 2:
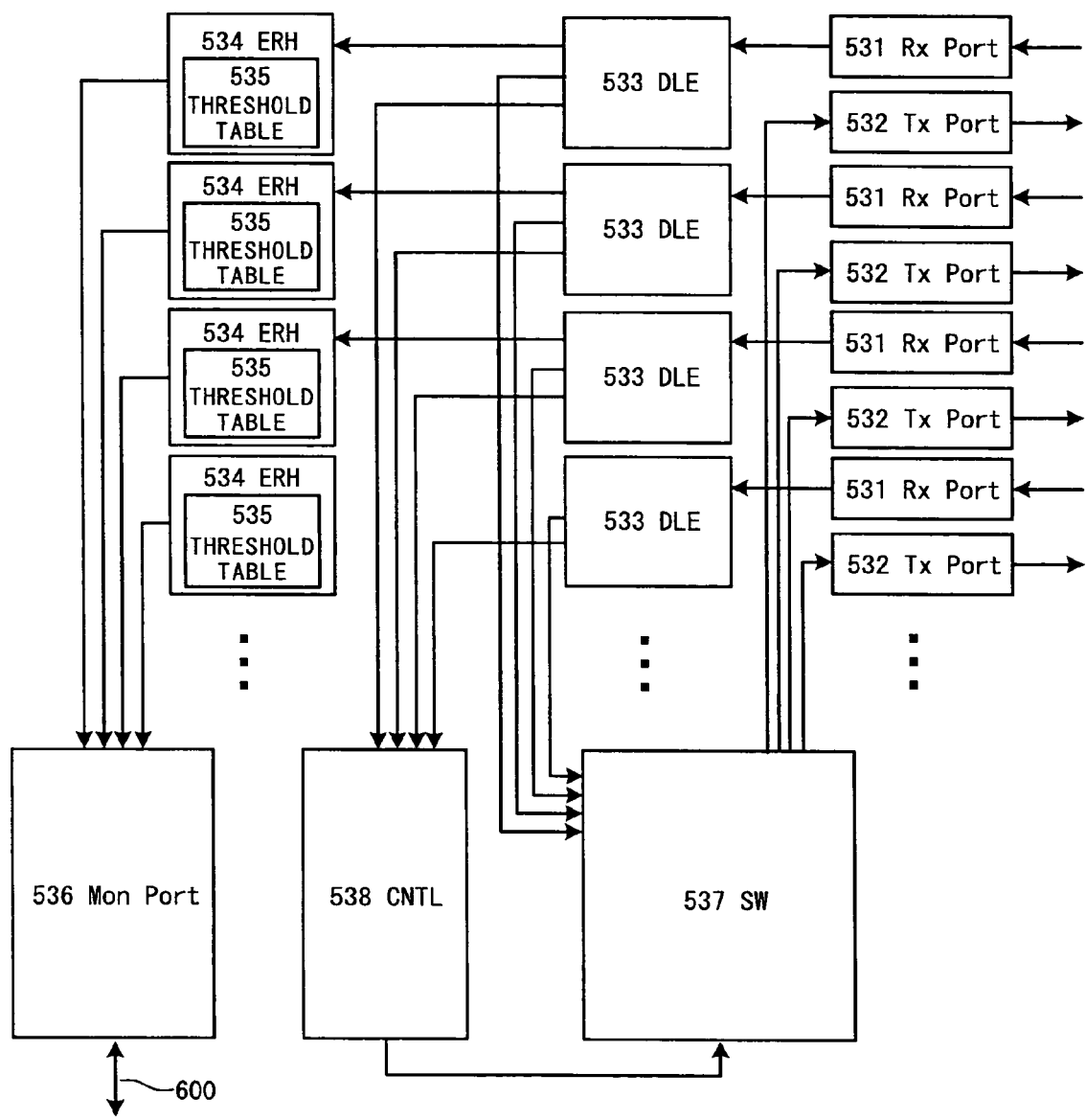
FIG. 2 is a block diagram of the disk subsystem according to the first embodiment of this invention.

FIG. 2 is a block diagram of the backend switch 530 according to the first embodiment of this invention.

The backend switch 530 is composed of plural receiving ports 531, plural transmitting ports 532, plural data link engines 533, plural error handlers 534, a backend switch status monitoring port 536, a switch circuit 537, and a switch controller 538. The receiving ports 531, the transmitting ports 532, the data link engines 533, and the error handlers 534 are included in equal number.

The receiving ports 531 are respectively connected to the protocol engines 230 in the disk adapter 200, to the disk drives 540 of their respective drive enclosures 500, or to the output ports 532 of the backend switch 530 in any of the other drive enclosures 500 than their respective drive enclosures 500, and receive data from the engines, the drives, and the ports.

The transmitting ports 532 are respectively connected to the protocol engines 230 in the disk adapter 200, to the disk drives 540 of their respective drive enclosures 500, or to the input ports 531 of the backend switch 530 in any of the other drive enclosures 500 than their respective drive enclosures 500, and transmit data from the engines, the drives, and the ports.

The receiving ports 531 and the transmitting ports 532 are used to connect the main data path.

The data link engines 533 receive data from the receiving ports 531 and control the operation of the switch circuit 537 through the switch controller 538. The data link engines 533 also monitor the operation status of the receiving port 531 and, upon detecting a fault, notify the error handlers 534 of the fault.

The error handlers 534 have threshold tables 535 and event counters to judge whether a fault is happening or not. The threshold tables 535 store a threshold for every fault type.

Examples of fault types include Loss of Synchronization, Loss of Signal, Protocol Error, 8b/10b invalid transmission word, and CRC Error. Loss of Synchronization is a physical layer error and refers to signals being out of synch. Loss of Signal is a physical layer error and refers to failed signal identification due to too small an oscillation or the like. Protocol Error is a transaction layer error and refers to reception of a signal with other sequences than a prescribed sequence. 8b/10b invalid transmission word is a data link layer error and refers to detection of a code that is not used in the communication in question. CRC Error is a data link layer error and refers to inconsistency between CRC codes obtained in different portions.

The event counters count up detected faults in order to judge by comparison against a predetermined threshold.

The backend switch status monitoring port 536 is connected to the DMA controller 220 in the disk adapter 200 by a backend switch status monitor line 600 to communicate the status of the backend switch 530.

The description given below is about the operation of the disk subsystem when a fault happens.

Figure 3:
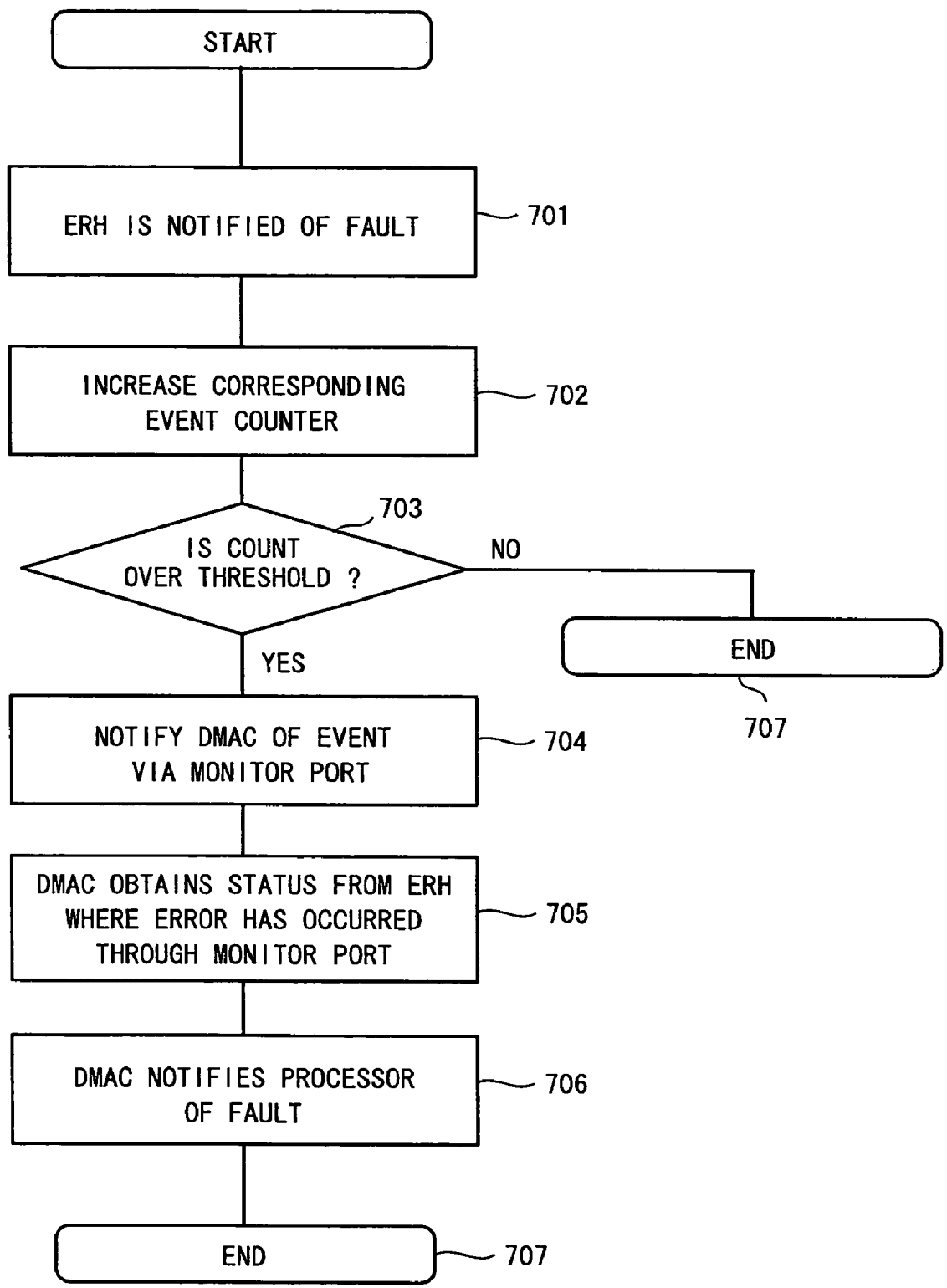
FIG. 3 is a flow chart of processing for notifying a fault in a backend switch according to the first embodiment of this invention.

FIG. 3 is a flow chart of processing for notifying a fault in a backend switch according to the first embodiment of this invention.

Upon detection of a fault, the data link engines 533 notify the error handlers 534 of the detection of the fault. The error handlers 534 receive the fault detection notification from the data link engines 533 (701).

Receiving the fault detection notification, the error handlers 534 increase the count of an event counter for the type of fault that has been notified (702). The error handlers 534 then compare this event counter of the fault against the threshold tables to judge whether the count exceeds the threshold or not (703).

When the count is equal to or less than the threshold, it is judged that the fault is not happening and this processing is terminated (707). This is because, in high-speed communications, the data link engines 533 sometimes detect a fault despite the ports being in a normal state. The threshold is therefore set slightly higher than a fault count that is detected in the normal state and a fault is judged to have occurred when the count of the fault exceeds the thus set threshold. This way occurrence of a fault can be judged appropriately. The count of each event counter is reset when the device is activated, when a given time period elapses, or at a given time, for example.

On the other hand, when the count is larger than the threshold, the error handlers 534 notify the event to the DMA controller 220 in the disk adapter 200 via the backend switch status monitoring port 536 (704).

Notified of the event, the DMA controller 220 obtains a status from a register of one of the error handlers 534 where the fault has occurred via the backend switch status monitoring port 536 (705).

The DMA controller 220 sends the obtained status to the processor 250 (706), at which point the processing of notifying a fault in a backend switch is terminated (707). Receiving the notification, the processor 250 identifies the cause of the fault from the status as shown in FIG. 4, which will be described later.

According to the fault notification processing (FIG. 3) of the first embodiment, the error handlers 534 in the backend switch 530 judge the port operation status for each fault type and this makes appropriate fault detection and fault report possible.

Figure 4:
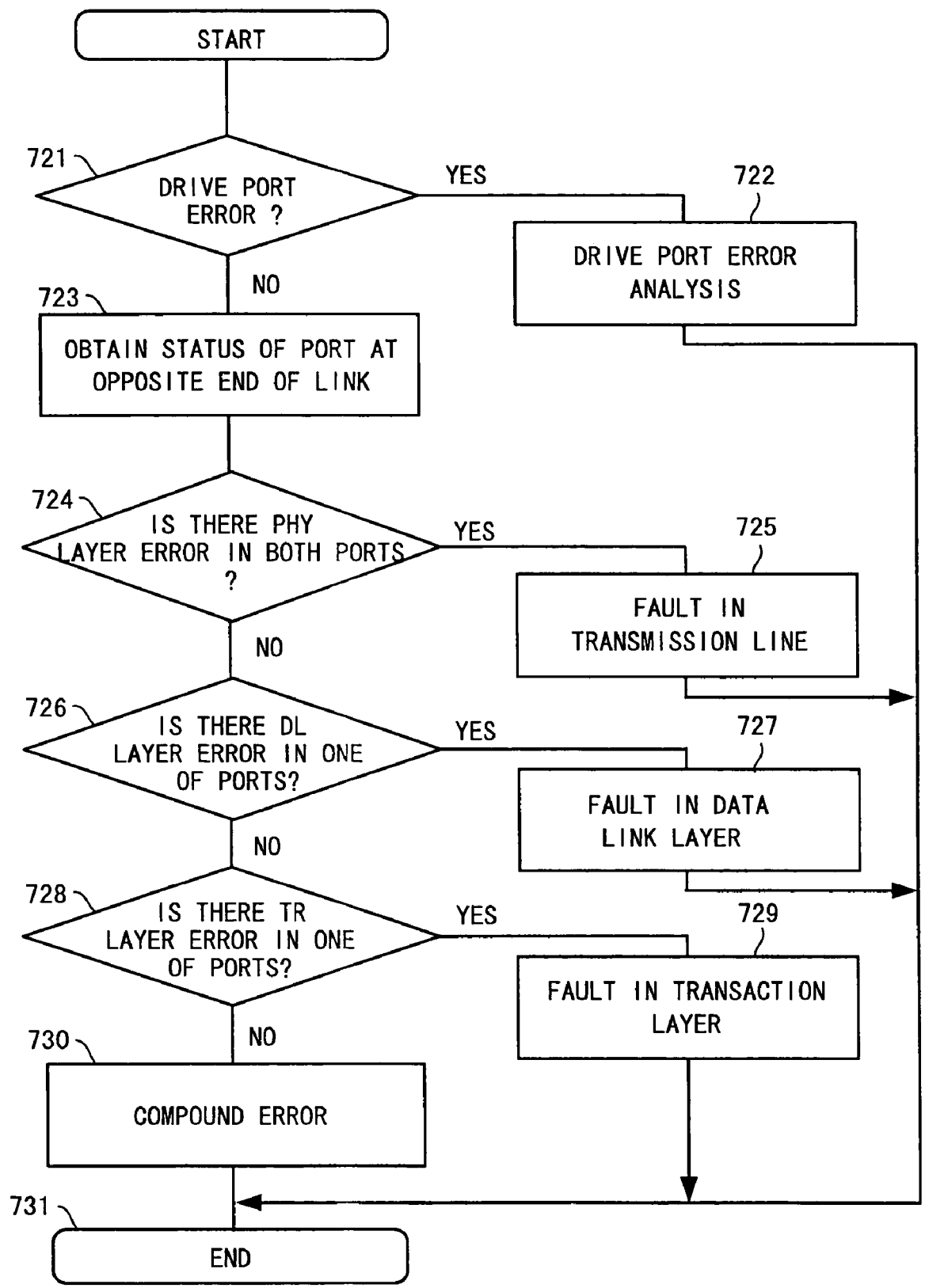
FIG. 4 is a flow chart of processing for identifying the cause of a fault in the backend switch according to the first embodiment of this invention.

FIG. 4 is a flow chart of processing for identifying the cause of a fault in a backend switch according to the first embodiment of this invention.

The processor 250 of the disk adapter 200 judges from the obtained status whether or not the port where the fault has occurred is a port to which one of the disk drives 540 is connected (drive port) (721).

When the port that has failed is a drive port, the processor 250 executes a drive port error analysis (722). The drive port error analysis judges whether or not one of the disk drives 540 that is connected to the drive port in question is accessible through a redundant port and a redundant path.

When the disk drive is accessible through a redundant port and a redundant path, the processor 250 determines that the cause is most likely to be a fault in a drive port of the backend switch 530 or a fault along a transmission line that connects the backend switch 530 and the disk drives 540 to each other.

When the disk drive is not accessible through a redundant port and a redundant path, on the other hand, the processor 250 determines that the cause is most likely to be a fault of this disk drive 540 itself and ends the processing for identifying the cause of a fault (731).

In the case where it is judged in the step 721 that the failed port is not a drive port, the processor 250 makes the DMA controller 220 obtain the status of a port that is connected to the failed port (port at the opposite end of the link). A port at the opposite end of the link is a port of another backend switch that is connected to a failed port or a port of a protocol engine.

The processor 250 then receives a notification of the status obtained by the DMA controller 220 (723).

The processor 250 judges whether or not a physical layer error such as Loss of Signal or Loss of Synchronization is happening in the failed port and in the port at the opposite end of the link (724). When there is a physical layer in both ports, the processor 250 determines that the cause is most likely to be a fault along the transmission line that connects the two ports (725), and ends the processing for identifying the cause of a fault (731). Identifying a transmission line fault from a physical layer error in both ports enhances the precision in identifying a fault.

When a physical layer error is not happening in one of the ports in the step 724, the processor 250 judges whether or not a data link layer error such as 8b/10b Error or CRC Error is happening in the failed port (726).

When there is a data link layer error in the failed port, the processor 250 determines that the cause is most likely to be a data link layer fault of this port (727), and ends the processing for identifying the cause of a fault (731).

In the case where the failed port is not having a data link layer error in the step 726, the processor 250 judges whether or not a transaction layer error such as Protocol Error is happening in the failed port (728). When there is a transaction layer error in the failed port, the processor 250 determines that the cause is most likely to be a transaction layer fault of this port (729), and ends the processing for identifying the case of a fault (731).

In the case where the failed port is not having a transaction layer error in the step 728, the processor 250 determines that the cause is most likely to be a compound error (730), and ends the processing for identifying the cause of a fault (731).

According to the processing for identifying the cause of a fault of the first embodiment (FIG. 4), the processor 250 is capable of identifying the correct cause of a fault by obtaining the operation status of a failed port and a port at the opposite end of the link through the status monitoring port 536 of the backend switch 530.

Figure 5:
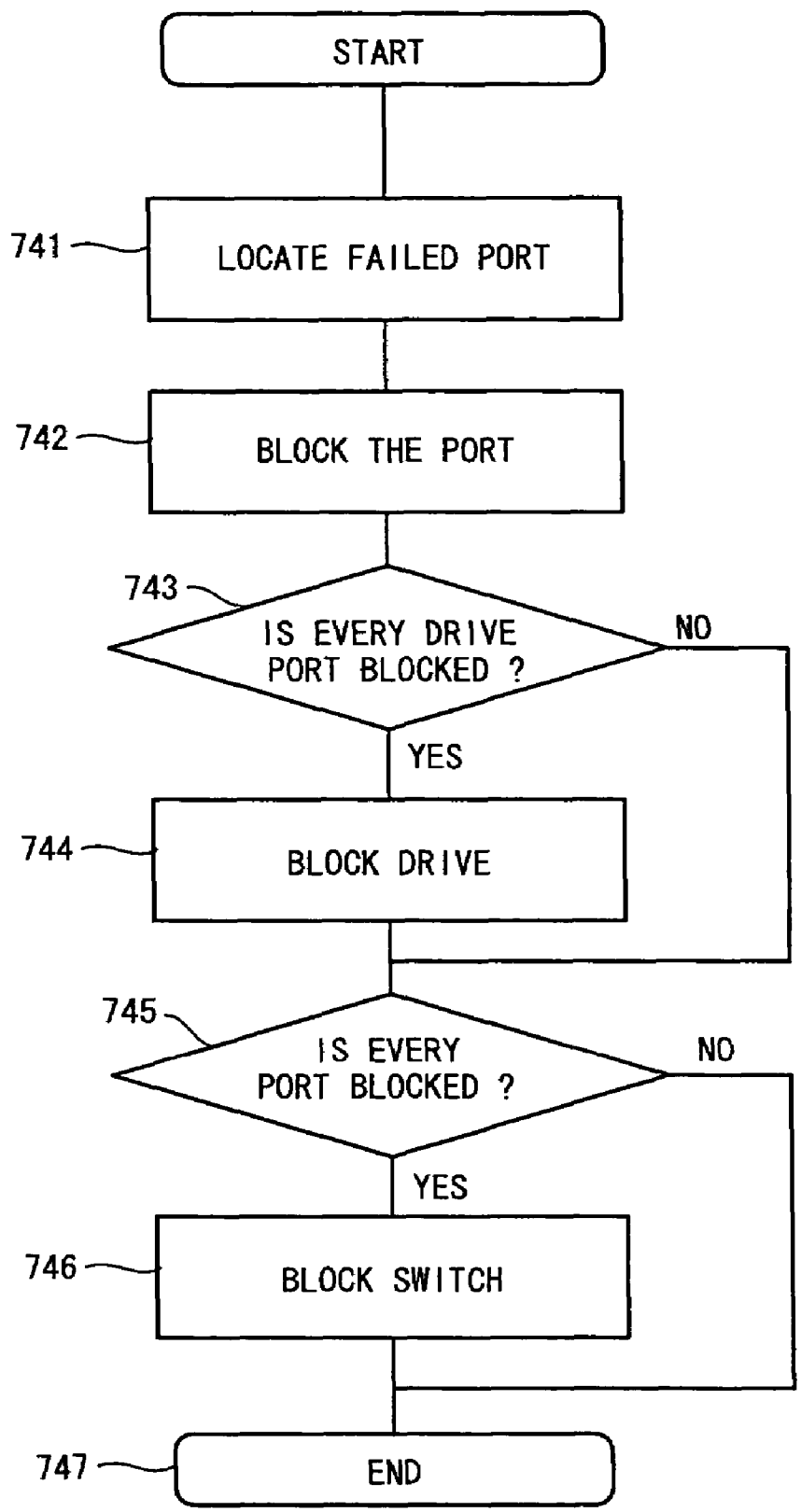
FIG. 5 is a flow chart for backend switch blocking processing according to the first embodiment of this invention.

FIG. 5 is a flow chart for backend switch blocking processing according to the first embodiment of this invention.

The processor 250 identifies the cause of a fault as described with reference to FIG. 4 and finds out a port that has caused the fault (741). Then the processor 250 blocks the port that has caused the fault (742). By blocking the port, the port is cut off of the disk subsystem and set to an unusable state.

The processor 250 next judges whether or not the blocked port is a drive port and whether or not both drive ports of the disk drives 540 connected to the blocked port are blocked (743). The "both drive ports" here refers to both of ports in the redundancy configuration. In fifth through ninth embodiments which will be described later, the phrase "both drive ports" refers to system A and system B drive ports.

When one of the two ports is not blocked, the processor 250 proceeds to a step 745.

On the other hand, when the drive ports are both blocked, the processor 250 blocks the disk drives 540 to which the drive ports are connected. Then data of the blocked disk drives 540 in a RAID group is reconstructed in other disk drives (744).

Next, the processor 250 judges whether every port in the backend switch 530 to which the blocked port belongs is blocked or not (745).

When there is a port left unblocked in the backend switch 530, the processor 250 terminates the blocking processing (747).

When every port in the backend switch 530 is blocked, on the other hand, the processor 250 blocks this backend switch 530 (746) and terminates the blocking processing (747). By blocking the backend switch 530, the backend switch 530 is cut off of the disk subsystem and set to an unusable state.

As has been described, in the first embodiment, the backend switch 530 in each of the drive enclosures 500 is connected directly to the DMA controller 220 in the disk adapter 200 and therefore the DMA controller 120 of the disk controller 10 can have a direct knowledge of the operation status of each port of the backend switch 530 through the fault monitoring port 536. This way the operation status of each of the drive enclosures 500 can be grasped despite the large number of the drive enclosures 500 connected to the disk controller 10. As a result, a fault point is quickly located, blocking processing is promptly carried out, and propagation of fault is avoided.

Second Embodiment

In a second embodiment of this invention, a control path is connected by a cascade connection. This makes the second embodiment differ from the first embodiment in how backend switch status monitor lines are connected. Components in the second embodiment that are identical with those in the first embodiment are denoted by the same symbols and descriptions thereof are omitted.

Figure 6:
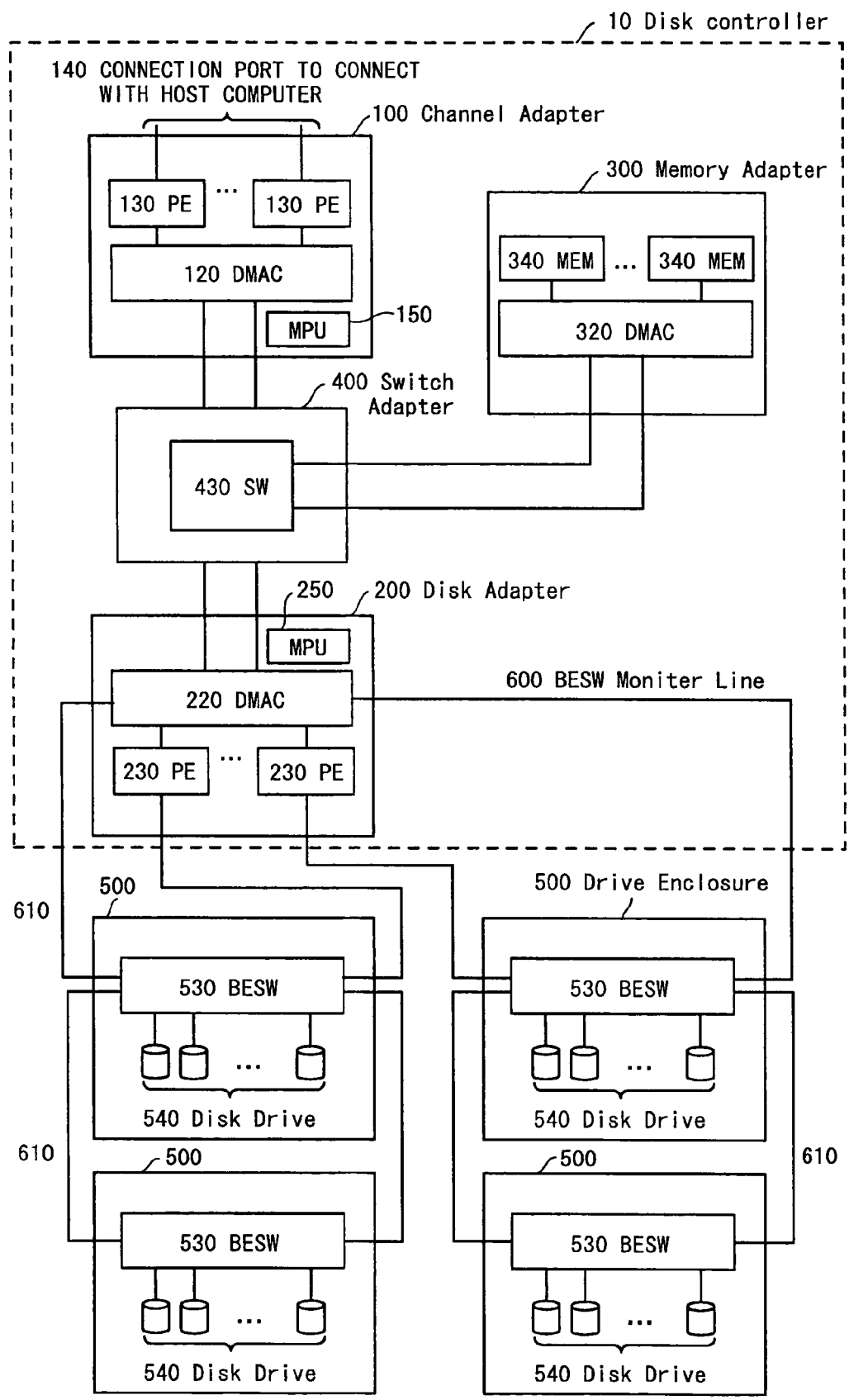
FIG. 6 is a block diagram of a disk subsystem according to a second embodiment of this invention.

FIG. 6 is a block diagram of a disk subsystem according to the second embodiment of this invention.

In the disk subsystem of the second embodiment, the backend switch 530 is connected to the DMA controller 220 by one of backend switch status monitor lines 610. Another of the backend switch status monitor lines 610 connects one backend switch 530 to another backend switch 530. Thus a control path is built by a cascade connection of the drive enclosures 500 to the disk adapter 200.

As described, in the second embodiment, the control path is built by the cascade connection of the drive enclosures 500 to the disk adapter 200 and therefore fewer backend switch status monitor lines 610 than in the first embodiment are needed to know the operation status of each port of the backend switch 530. Fewer backend switch status monitor lines 610 mean fewer ports of the DMA controller 220 which are connected to the backend switch status monitor lines 610. Accordingly, a fault point can be located for each of the disk drives 540 to block the disk drives 540 where the fault has occurred despite the disk subsystem having the drive enclosures 500 connected in large number.

Third Embodiment

In the third embodiment, a control path is connected in a ring-like manner. This makes the third embodiment differ from the first embodiment in how backend switch status monitor lines are connected. Components in the third embodiment that are identical with those in the first embodiment are denoted by the same symbols and descriptions thereof are omitted.

Figure 7:
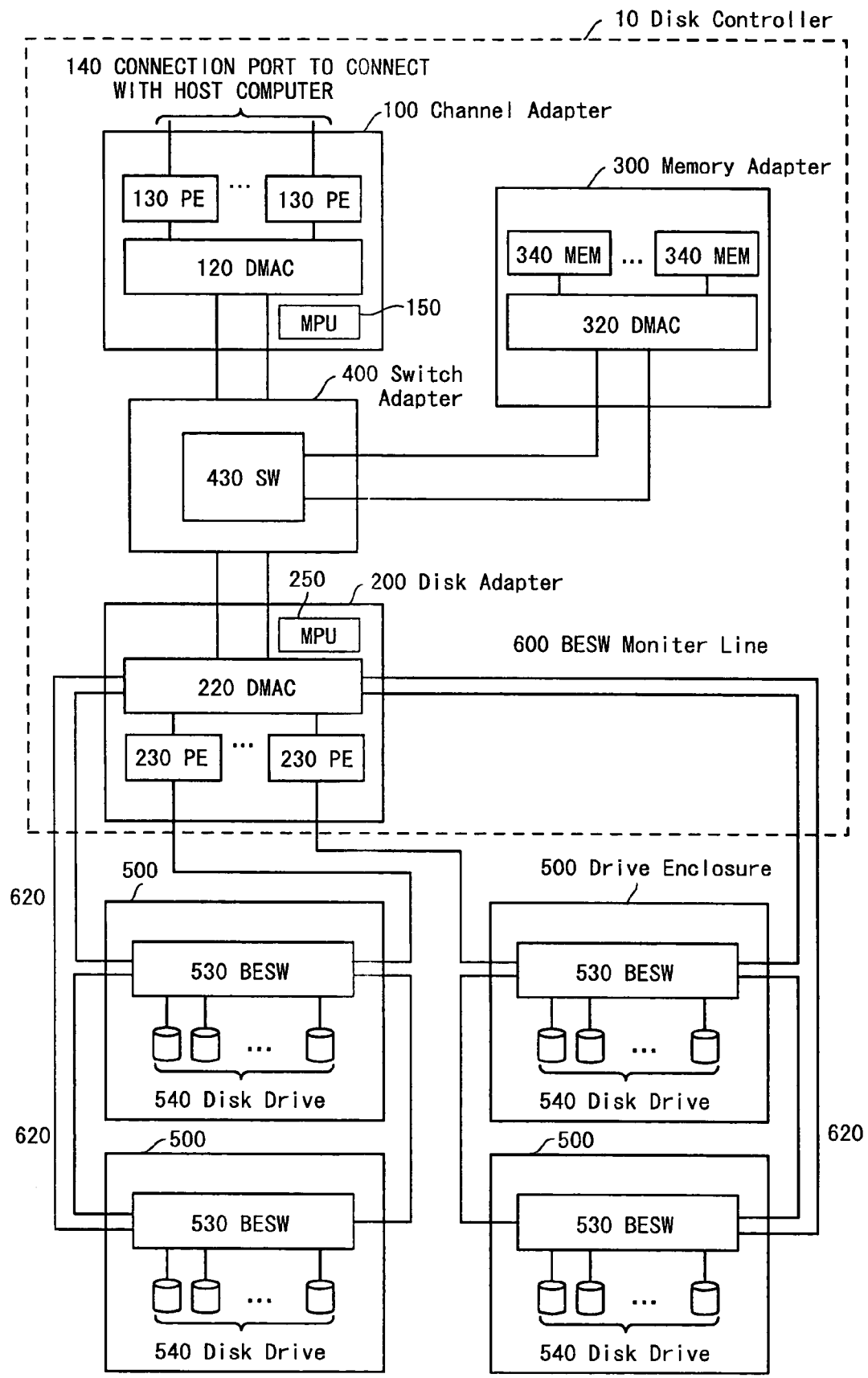
FIG. 7 is a block diagram of a disk subsystem according to a third embodiment of this invention.

FIG. 7 is a block diagram of a disk subsystem according to the third embodiment of this invention.

In the disk subsystem of the third embodiment, the backend switch 530 is connected to the DMA controller 220 by one of backend switch status monitor lines 620. Another of the backend switch status monitor lines 620 connects one backend switch 530 to another backend switch 530. Thus the drive enclosures 500 are connected to the disk adapter 200 in a ring-like manner and a ring-like control path is obtained.

As has been described, in the third embodiment, the control path is built by connecting the drive enclosures 500 to the disk adapter 200 in a ring-like manner. Therefore, upon occurrence of a fault at one point in the backend switch status monitor lines 620, the DMA controller 220 of the disk adapter 200 can use a reverse path of the ring connection to know the operation status of each port of the backend switch 530. This fortifies the disk subsystem against a fault of the backend switch status monitor lines 620, improves the reliability in locating a fault point for each of the disk drives 540, and makes it possible to block the disk drives 540 where the fault has occurred.

Fourth Embodiment

In a fourth embodiment of this invention, communications over a control path are in-band communications over the same signal lines that are used by a main data path. This makes the fourth embodiment differ from the first embodiment in redundancy of the disk adapter 200 and how the disk adapter 200 is connected to the drive enclosures 500. Components in the fourth embodiment that are identical with those in the first embodiment are denoted by the same symbols and descriptions thereof are omitted.

Figure 8:
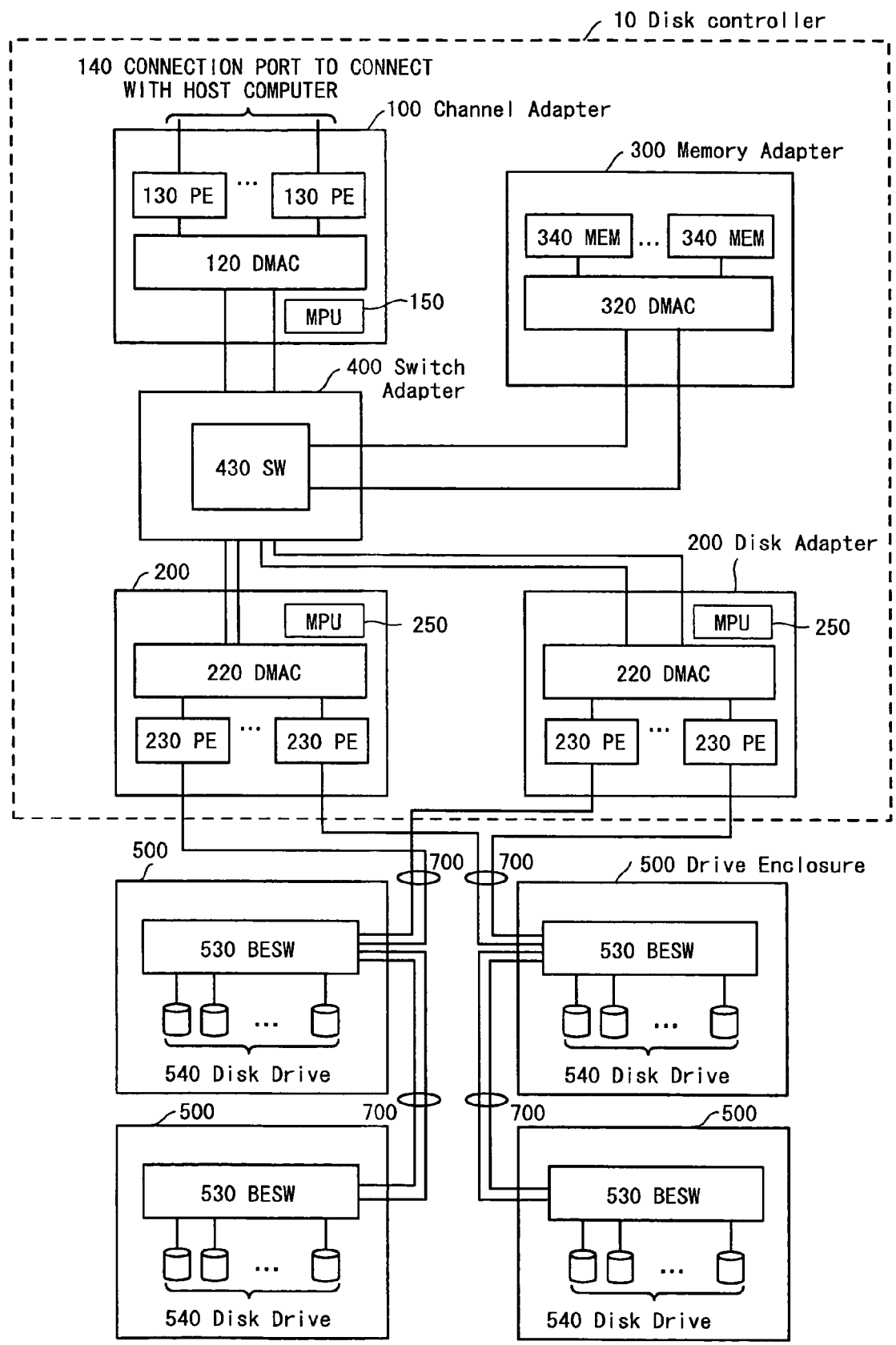
FIG. 8 is a block diagram of a disk subsystem according to a fourth embodiment of this invention.

FIG. 8 is a block diagram of a disk subsystem according to the fourth embodiment of this invention.

The disk controller 10 of the fourth embodiment has two disk adapters 200.

The drive enclosures 500 are connected to both of the disk adapters 200 by the FC-AL connection via signal lines 700, which are used for data transfer and for transmission/reception of control signals. The signal lines 700 double as a control path and a main data path, and communicate control signals in-band. Each of the signal lines 700 may be composed of plural communication lines so that a fault along one of the lines does not inhibit communication of fault information.

As has been described, in the fourth embodiment, the plural signal lines 700 connect the drive enclosures 500 to the disk adapters 200. Therefore, when a fault occurs along one of the signal lines 700, fault information is obtained through the rest of the signal lines 700 where there is no fault. A control path is provided separately from a main data path, and a fault point is located for each of the disk drives 540 Thus, the DMA controller 220 of each of the disk adapters 200 obtains the operation status of each port of the backend switch 530, and the disk drives 540 where the fault has occurred can be blocked.

Fifth Embodiment

In a fifth embodiment of this invention, the disk controller 10 is given a redundant configuration. This makes the fifth embodiment differ from the first embodiment in configuration of the disk controller 10. Components in the fifth embodiment that are identical with those in the first embodiment are denoted by the same symbols and descriptions thereof are omitted.

Figure 9:
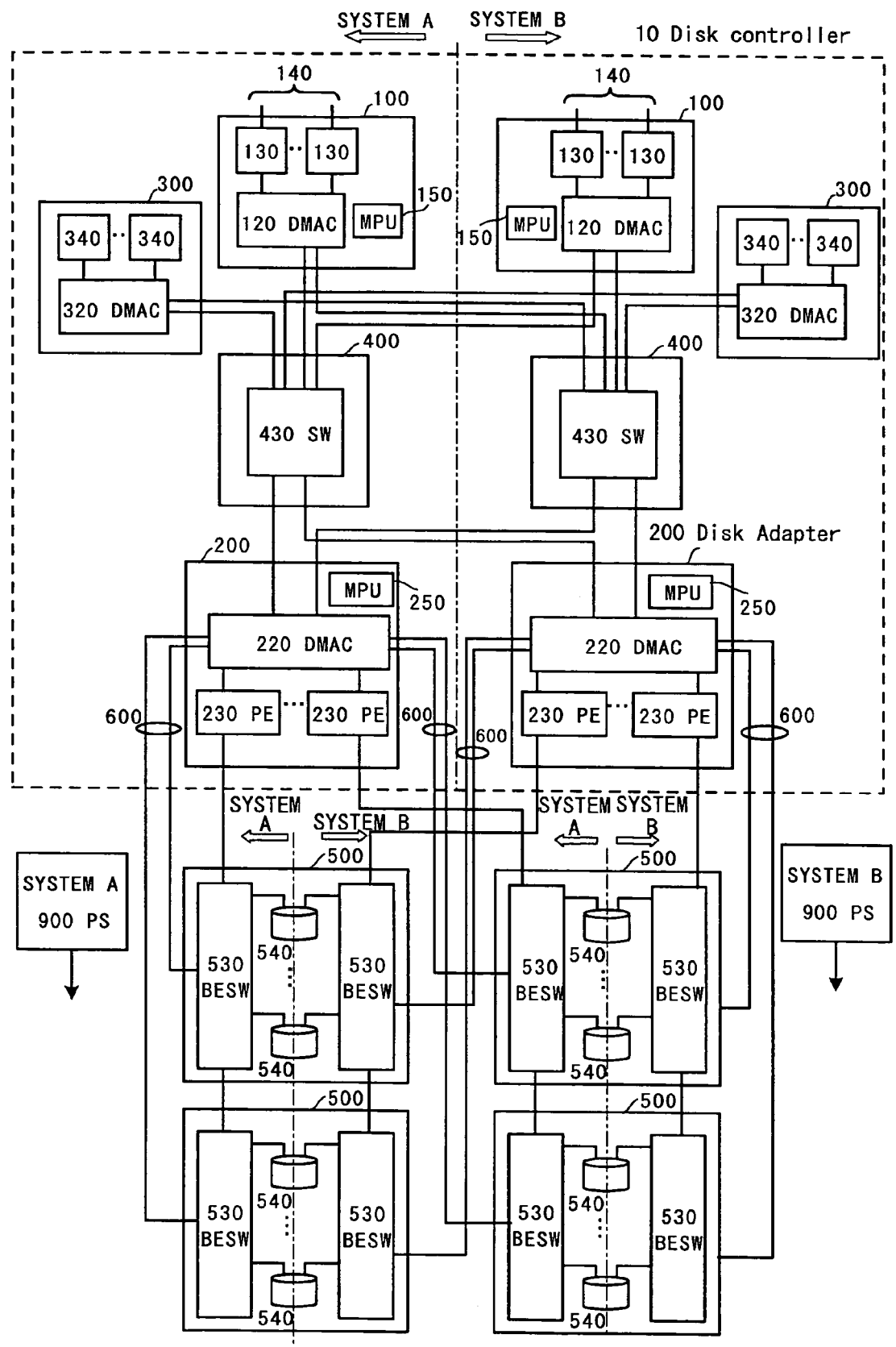
FIG. 9 is a block diagram of a disk subsystem according to fifth and sixth embodiments of this invention.

FIG. 9 is a block diagram of a disk subsystem according to the fifth embodiment of this invention.

The adapters 100, 200, 300 and 400 which constitute the disk controller 10 are each divided into system A and system B. The channel adapters 100, the disk adapters 200 and the memory adapters 300 are connected to the switch adapters 400 of the system A and system B both, thereby giving every component redundancy.

The drive enclosures 500 each have a system A backend switch 530 and a system B backend switch 530. The disk drives 540 each have a system A port and a system B port. The system A port of each of the disk drives 540 is connected to the system A backend switch 530 whereas the system B port is connected to the system B backend switch 530.

The system A backend switch 530 in each of the drive enclosures 500 is connected by the FC-AL connection to one of the protocol engines 230 in the system A disk adapter 200 to build a system A main data path. Similarly, the system B backend switch 530 in each of the drive enclosures 500 is connected by the FC-AL connection to one of the protocol engines 230 in the system B disk adapter 200 to build a system B main data path.

The backend switch status monitor lines 600 are used to connect the system A backend switch 530 in every one of the drive enclosures 500 directly to the DMA controller 220 in the system A disk adapter 200 to build a system A control path. Similarly, the backend switch status monitor lines 600 are used to connect the system B backend switch 530 in every one of the drive enclosures 500 directly to the DMA controller 220 in the system B disk adapter 200 to build a system B control path.

In the fifth embodiment, every component and every path from the host computer to the disk drives 540 have redundancies. This makes it possible to use redundant portions to continue processing when a fault occurs at one point. The disk adapters 200 thus can obtain fault information of a fault that has occurred at one point by using redundant portions. The disk adapters 200 locate a fault point for each of the disk drives 540 from the obtained information and block the disk drives 540 where the fault has occurred.

Sixth Embodiment

A sixth embodiment of this invention is a modification of the fifth embodiment in which the power supply system too is given a redundant configuration. This makes the sixth embodiment differ from the fifth embodiment in that a disk subsystem of the sixth embodiment has two power supplies. Components in the sixth embodiment that are identical with those in the fifth embodiment are denoted by the same symbols and descriptions thereof are omitted.

The sixth embodiment is described with reference to FIG. 9.

The disk subsystem of the sixth embodiment has two independent power supply systems, a system A power supply 900 and a system B power supply 900.

The system A backend switch 530 and all the system A adapters 100, 200, 300 and 400 are driven by the system A power supply 900. Similarly, the system B backend switch 530 and all the B-system adapters 100, 200, 300 and 400 are driven by the system B power supply 900. The disk drives 540 are driven by the system A power supply and the system B power supply both.

In the sixth embodiment, the entire disk subsystem including the power supplies 900 has redundancies and, therefore, when there is a fault in one of the power supplies 900, the other of the power supplies 900 can be used to continue processing. This enables the disk adapters 200 to obtain, through redundant portions, fault information of a fault that has occurred at a point including a power failure. The disk adapters 200 locate a fault point for each of the disk drives 540 from the obtained information and block the disk drives 540 where the fault has occurred.

Seventh Embodiment

In a seventh embodiment of this invention, a RAID group is constituted across different loops. This makes the seventh embodiment differ from the fifth embodiment in how backend switch status monitor lines are connected. Components in the seventh embodiment that are identical with those in the fifth embodiment are denoted by the same symbols and descriptions thereof are omitted.

Figure 10:
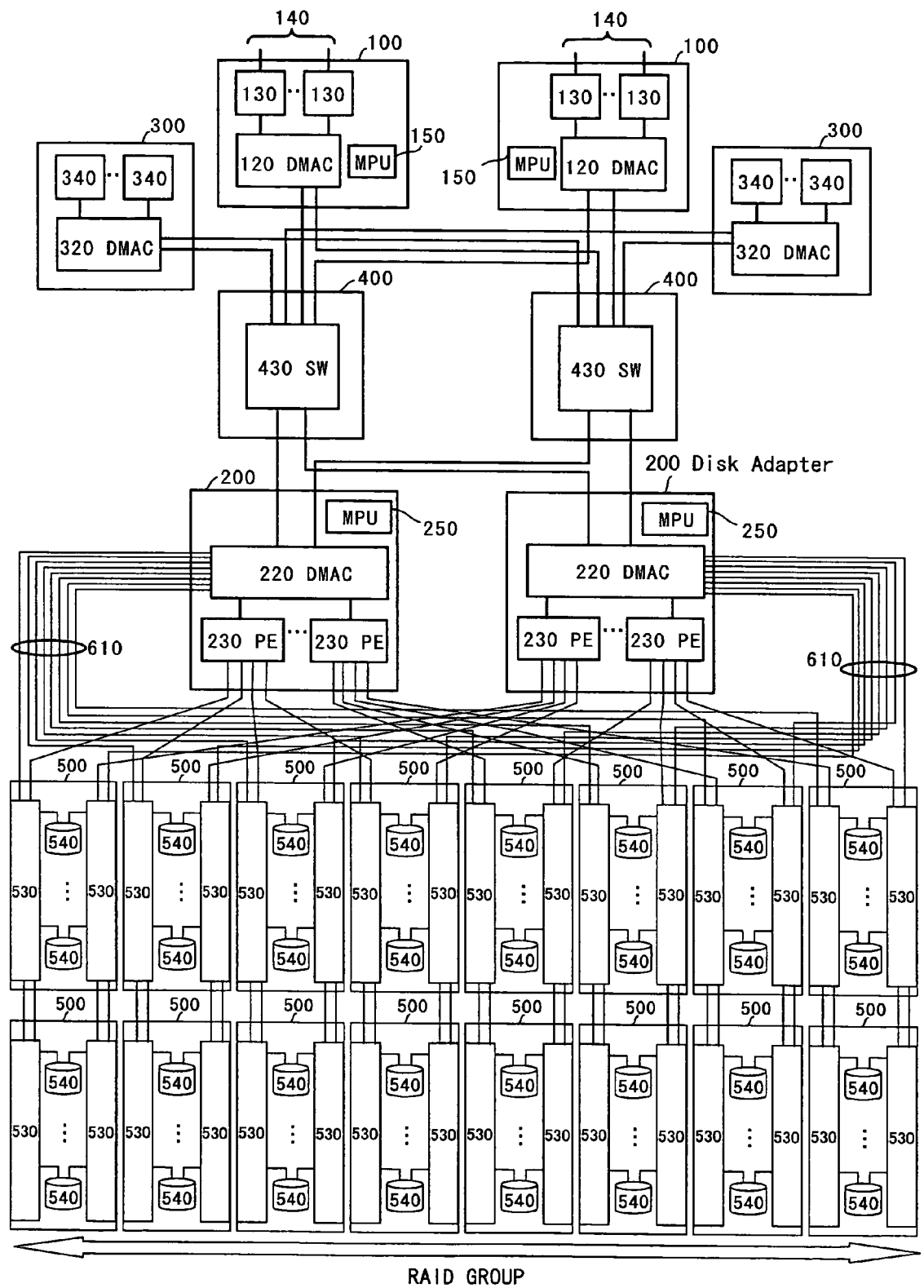
FIG. 10 is a block diagram of a disk subsystem according to a seventh embodiment of this invention.

FIG. 10 is a block diagram of a disk subsystem according to the seventh embodiment of this invention.

A main data path is built by connecting the drive enclosures 500 to the disk adapters 200 through the FC-AL connection. The drive enclosures 500 connected through the FC-AL connection are divided into several loops.

Similarly, a control path is built by connecting the drive enclosures 500 to the disk adapters 200 through the FC-AL connection via the backend switch status monitor lines 610.

In this disk subsystem, the disk drives 540 belonging to different FC-AL connection loops constitute a RAID group.

The seventh embodiment is capable of recovering data upon occurrence of a fault in the disk drives 540 inside the drive enclosures 500 from the disk drives 540 belonging to an FC-AL loop that is independent of an FC-AL group where the fault has occurred. Therefore, when a fault occurs at one point in the disk subsystem including a drive fault, the reliability is high in performing data recovery processing on data of the disk drives 540 that have failed. It is also possible to block the disk drives 540 that have failed by locating a fault point for each of the disk drives 540 from obtained information.

Eighth Embodiment

In a eighth embodiment of this invention, a RAID group is constituted across same loops. This makes the eighth embodiment differ from seventh embodiment in how the RAID group is constituted. Components in the eighth embodiment that are identical with those in the fifth embodiment are denoted by the same symbols and descriptions thereof are omitted.

Figure 11:
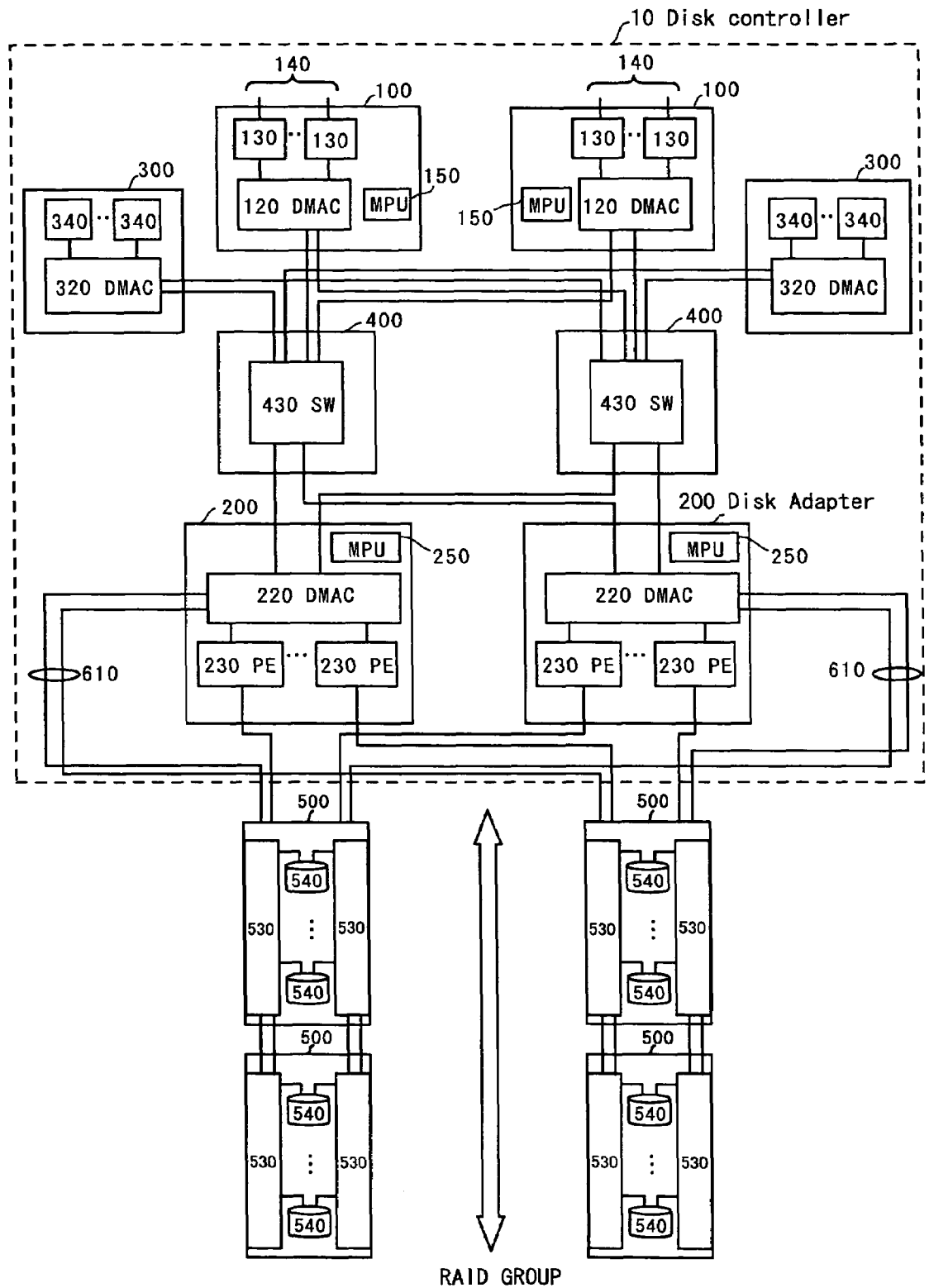
FIG. 11 is a block diagram of a disk subsystem according to an eighth embodiment of this invention.

FIG. 11 is a block diagram of a disk subsystem according to the eighth embodiment of this invention.

A main data path is built by connecting the drive enclosures 500 to the disk adapters 200 through the FC-AL connection. The drive enclosures 500 connected through the FC-AL connection are divided into several loops.

Similarly, a control path is built by connecting the drive enclosures 500 to the disk adapters 200 through the FC-AL connection via the backend switch status monitor lines 610.

In this disk subsystem, the disk drives 540 belonging to different FC-AL connection loops constitute a RAID group.

According to the eighth embodiment in which disk drives in the same loop constitute a RAID group, the DMA controller 220 in the disk adapter 200 can have fewer ports even when a RAID group of high data input/output efficiency such as 7D+1P is to be constituted. This makes it possible to locate a fault point for each of the disk drives 540 at reduced cost and to block the disk drives 540 where the fault has occurred. In addition, data recovery processing can be performed at reduced cost on data of the disk drives 540 where the fault has happened.

Ninth Embodiment

In a ninth embodiment of this invention, the disk controller 10 has processor adapters. Components in the ninth embodiment that are identical with those in the fifth embodiment are denoted by the same symbols and descriptions thereof are omitted.

Figure 12:
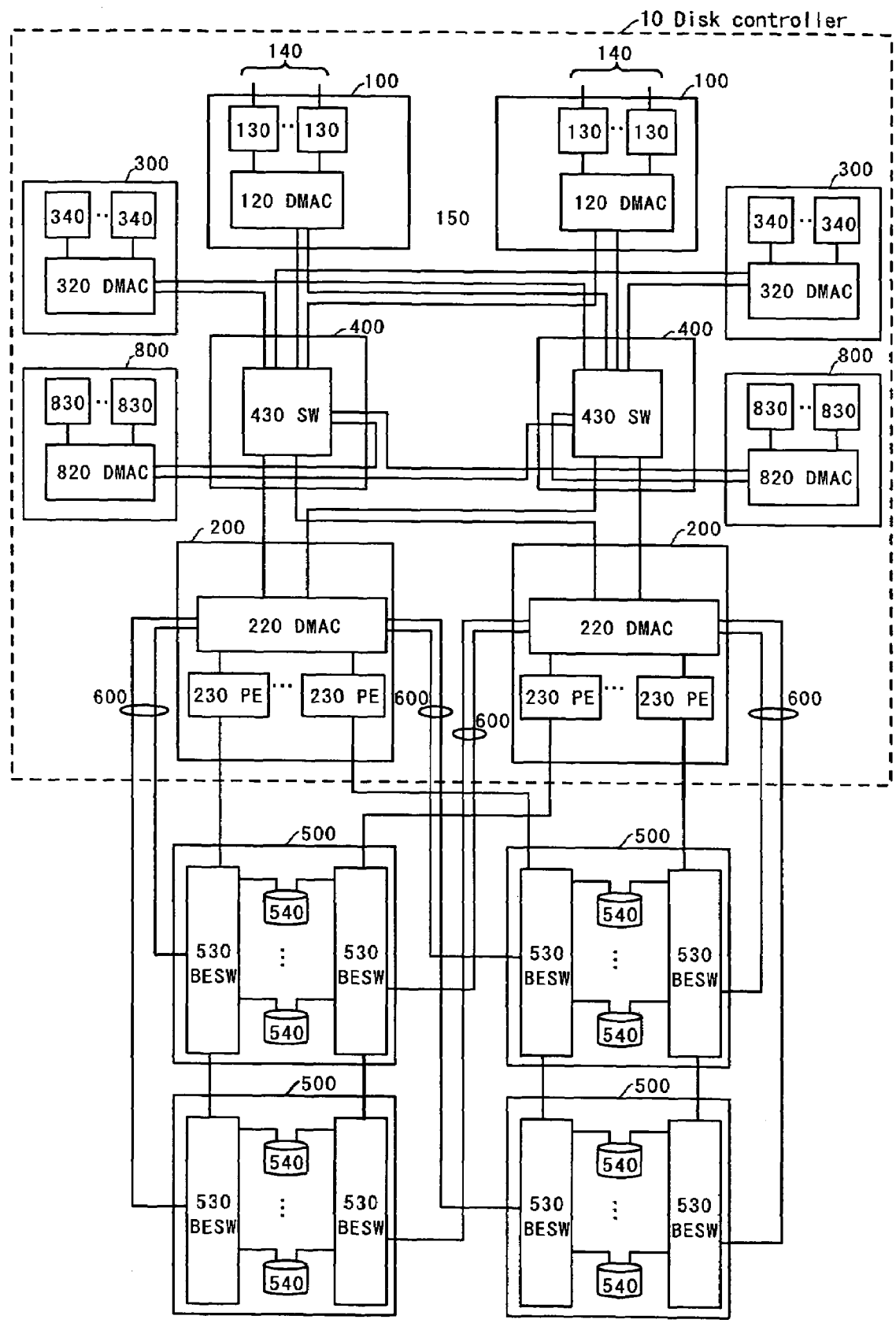
FIG. 12 is a block diagram of a disk subsystem according to a ninth embodiment of this invention.
Figure 13:
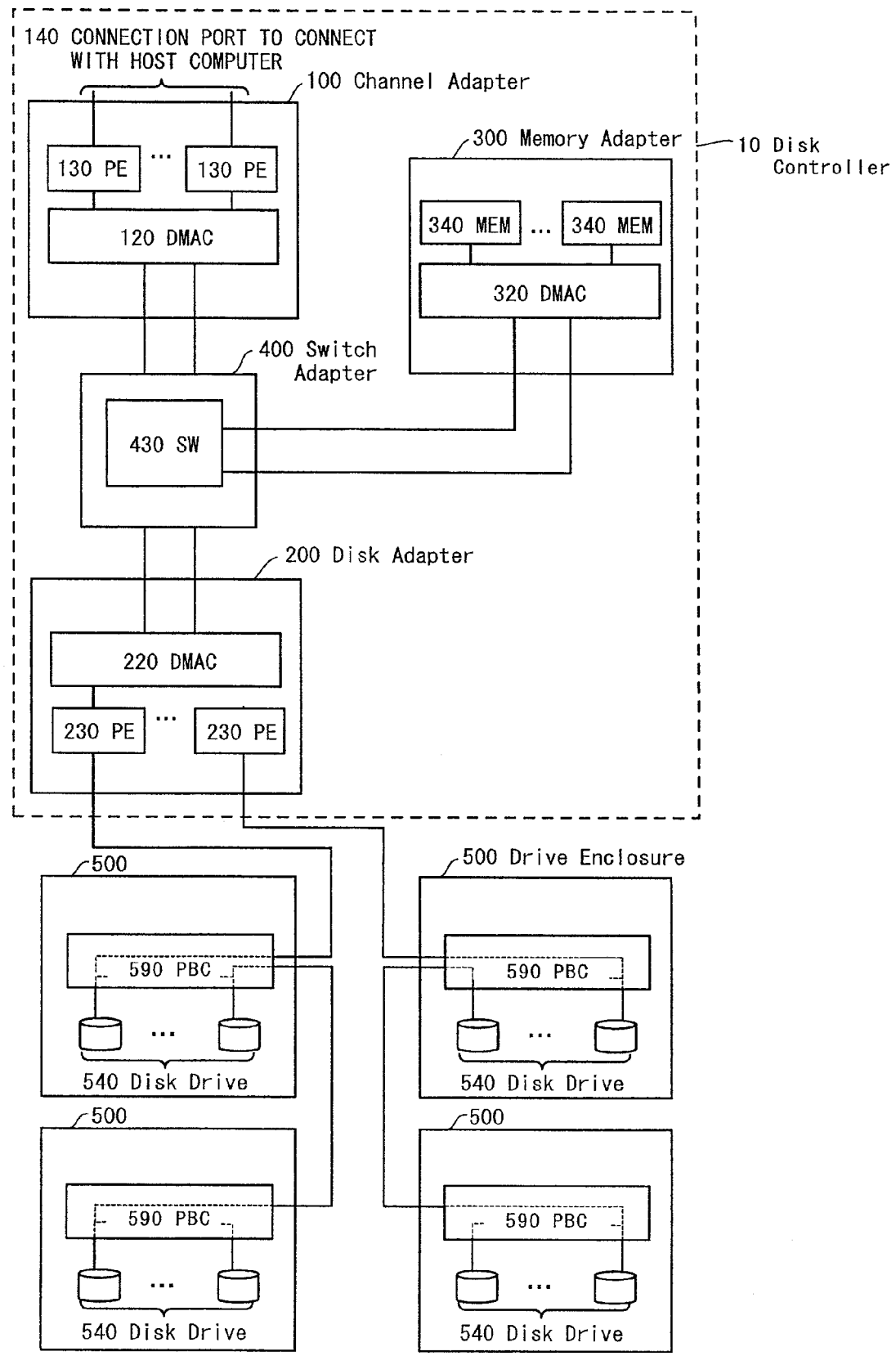
FIG. 13 is a block diagram of a disk subsystem according to prior art.

FIG. 12 is a block diagram of a disk subsystem according to the ninth embodiment of this invention.

The disk subsystem has two processor adapters, a system A processor adapter 800 and a system B processor adapter 800. The processor adapters 800 each have a DMA controller 820 and one or more processors 830.

The DMA controller 820 is connected to the system A and system B switch channel adapters to communicate with the channel adapters 100, the disk adapters 200, and the memory adapters 300.

The processor(s) 830 controls the overall operation of the disk controller 10. In the ninth embodiment, the processor 150 in the channel adapters 100 and the processor 250 in the disk adapters 200 may be omitted.

The ninth embodiment has the processor adapters 800 independent of the channel adapters 100 and the disk adapters 200, and therefore is capable of adjusting the number of the processors 830 in the processor adapters 800. This makes it possible to achieve a disk subsystem performance that flexibly conforms to needs of customers. A disk subsystem of high cost performance can thus be provided.

While the present invention has been described in detail and pictorially in the accompanying drawings, the present invention is not limited to such detail but covers various obvious modifications and equivalent arrangements, which fall within the purview of the appended claims.

What is claimed is:

1. A disk subsystem, comprising:

plural drive enclosures which store disk drives; and a disk controller which controls transfer of data stored in the disk drives between the drive enclosures and a host computer, wherein the drive enclosures each comprise a backend switch which is coupled to at least two of the disk drives and to the disk controller via at least four communication lines, wherein the backend switch comprises at least four switch ports including a first data communication port connected to one of the at least two disk drives through a first communication line, a second data communication port connected to another of the at least two disk drives through a second communication line, a third data communication port connected to the disk controller through a third communication line, and a status monitoring port, connected to the disk controller through a fourth communication line, separate from the third communication line, through which operation status of the switch ports of the backend switch is outputted, wherein the disk controller monitors a fault of the switch ports through the status monitoring port, wherein an indication of the fault being detected in one of the first, second or third data communication ports is provided to the disk controller through the status monitoring port and the fourth communication line connected between the status monitoring port and the disk controller, wherein the disk controller controls the backend switch to block one of the first and second data communication ports when the fault is detected in one of the first and second data communication ports while not blocking the other of the first and second data communication ports when no fault is detected in said other of the first and second data communication ports, and wherein the disk controller blocks the backend switch when every switch port included in the backend switch is blocked by the fault so that the backend switch is cut off from the disk subsystem, wherein said disk subsystem further comprises:

a fault detecting unit which detects the fault in the switch ports; and an error handler which counts number of faults detected by the fault detecting unit, compares the number of faults and a predetermined threshold for each fault type, and provides the disk controller with fault information of the switch ports based on results of the comparison to thereby identify which one of the switch ports have the fault, wherein:

the disk controller judges whether the fault corresponds to a failed switch port is a drive port to which one of the disk drives is connected, the disk controller judges whether one of the disk drives is accessible through a redundant port and a redundant path when the judged fault corresponds to the failed switch port being the drive port, the disk controller determines that the fault has occurred in at least one of the backend switch and a transmission line that connects the backend switch and the disk drives when the disk controller judged that the disk drive is accessible through the redundant port and the redundant path, and the disk controller determines that the fault has occurred in the disk drive when the disk controller judged that the disk drive is not accessible through the redundant port and the redundant path.

2. The disk subsystem according to claim 1, wherein, when there is the fault of the switch port that couples the backend switch to another backend switch, the disk controller obtains operation status of a switch port that is coupled to the failed switch port upon reception of the fault information from the backend switch.

3. The disk subsystem according to claim 1, wherein the disk controller is adapted to perform at least one operation of locating a point where a fault has occurred and identifying a cause of the fault from the fault information provided by the backend switch.

4. The disk subsystem according to claim 1, wherein the status monitoring port is coupled directly to the disk controller.

5. The disk subsystem according to claim 1, wherein the status monitoring port is coupled to the disk controller by cascade connection.

6. The disk subsystem according to claim 1, wherein the status monitoring port is coupled to the disk controller by ring connection.

7. The disk subsystem according to claim 1, wherein the backend switch is coupled to the disk controller by plural data transmission lines, and wherein the backend switch monitors the fault of the switch ports in band through the plural data transmission lines.

8. The disk subsystem according to claim 1, wherein the disk controller comprises a first disk adapter and a second disk adapter which are coupled to the drive enclosures, the backend switch comprises a first backend switch and a second backend switch, each of the first backend switch and the second backend switch comprising a respective first and second status monitoring port through which operation status of the switch ports of the backend switch is outputted, the disk drives are coupled to the first backend switch and to the second backend switch, the first status monitoring port of the first backend switch is coupled to the first disk adapter, the status monitoring port of the second backend switch is connected to the second disk adapter, and the disk controller monitors the fault of the disk drives through the respective first and second status monitoring ports.

9. The disk subsystem according to claim 8, further comprising: a first power supply which drives the first backend switch and the first disk adapter; and a second power supply which drives the second backend switch and the second disk adapter, wherein the disk drives are supplied with electric power from the first power supply and the second power supply both.

10. The disk subsystem according to claim 1, wherein the status monitoring port is coupled to the disk controller by loop connection, and the disk drive coupled to the back end switches that are included in different loop connections constitute a RAID group.

11. The disk subsystem according to claim 1, wherein the status monitoring port is coupled to the disk controller by loop connection, and the disk drive coupled to the back end switches that are included in the same loop connections constitute a RAID group.

12. The disk subsystem according to claim 1, wherein the disk controller comprises a processor adapter which comprises a processor to control the overall operation of the disk controller.

13. A disk subsystem comprising:

plural drive enclosures each comprising disk drives, and first and second backend switches; and a disk controller comprising first and second channel adapters, first and second disk adapters, first and second memory adapters, first and second switch adapters, and first and second processor adapters, and transferring data stored in the disk drives between the drive enclosures and a host computer, wherein each of the first and second backend switches is coupled to at least two of the disk drives and to the disk controller via at least four communication lines, wherein the first and second backend switches each comprise at least four switch ports including a first data communication port connected to one of the at least two disk drives through a first communication line, a second data communication port connected to another of the at least two disk drives through a second communication line, a third data communication port connected to the disk controller through a third communication line, and a status monitoring port, connected to the disk controller through a fourth communication line, separate from the third communication line, through which operation status of the switch ports of the backend switches are outputted, wherein the disk controller monitors a fault of the switch ports through the status monitoring port, wherein an indication of the fault being detected in one of the first, second or third data communication ports is provided to the disk controller through the status monitoring port and the fourth communication line connected between the status monitoring port and the disk controller, and wherein the disk controller controls each of the first and second backend switches to block one of the first and second data communication ports when the fault is detected in said one of the first and second data communication ports while not blocking the other of the first and second data communication ports when no fault is detected in said other of the first and second data communication ports, wherein the disk subsystem further comprises:

a fault detecting unit which detects the fault in the switch ports; and an error handler which counts number of faults detected by the fault detecting unit, compares the number of faults and a predetermined threshold for each fault type, and provides the disk controller with fault information of the switch ports based on results of the comparison to thereby identify which one of the switch ports have the fault, wherein:

the disk controller judges whether the fault corresponds to a failed switch port is a drive port to which one of the disk drives is connected, the disk controller judges whether one of the disk drives is accessible through a redundant port and a redundant path when the judged fault corresponds to the failed switch port being the drive port, the disk controller determines that the fault has occurred in at least one of the first or second backend switch and a transmission line that connects the at least one of the first or second backend switch and the disk drives when the disk controller judged that the disk drive is accessible through a redundant port and a redundant path, and the disk controller determines that the fault has occurred in the disk drive when the disk controller judged that the disk drive is not accessible through the redundant port and the redundant path.

14. The disk subsystem according to claim 1, wherein:

the disk controller judges whether a physical layer error is detected in at least one of the failed switch port and in a switch port at an opposite end of a link with the failed switch port in a case where it is judged that the failed switch port is not the drive port, the disk controller determines that the fault has occurred at one of the transmission lines that connects the failed switch port and the opposite switch port in a case where it is judged that the physical layer error has occurred in at least one of the failed switch port and the opposite switch port, the disk controller judges whether a data link layer error is detected at least one of in the failed switch port in a case where it is judged that the physical layer error has occurred in at least one of the failed switch port and the opposite switch port, the disk controller determines that the data link layer error has occurred in a case where it is judged that a data link layer error occurs in at least one of the failed switch port and the opposite switch port, and the disk controller judges whether a transaction layer error is detected in at least one of the failed switch port and the opposite switch port in a case where it is judged that the data link layer error has not occurred in the failed switch port.

15. The disk subsystem according to claim 13, wherein:

the disk controller judges whether a physical layer error is detected in at least one of the failed switch port and in a switch port at an opposite end of a link with the failed switch port in a case where it is judged that the failed switch port is not the drive port, the disk controller determines that the fault has occurred at one of the transmission lines that connects the failed switch port and the opposite switch port in a case where it is judged that the physical layer error has occurred in at least one of the failed switch port and the opposite switch port, the disk controller judges whether a data link layer error is detected at least one of in the failed switch port in a case where it is judged that the physical layer error has occurred in at least one of the failed switch port and the opposite switch port, the disk controller determines that the data link layer error has occurred in a case where it is judged that the data link layer error occurs in at least one of the failed switch port and the opposite switch port, and the disk controller judges whether a transaction layer error is detected in at least one of the tailed switch port and the opposite switch port in a case where it is judged that the data link layer error has not occurred in the failed switch port.

* * * * *